United States Patent [19]

Anner et al.

[11] 3,758,524
[45] Sept. 11, 1973

[54] PROCESS FOR THE MANUFACTURE OF 21-FLUOROSTEROIDS
[75] Inventors: Georg Anner, Basel; Peter Wieland, Oberwil, both of Switzerland
[73] Assignee: Ciba-Geigy Corporation, Ardsley, N.Y.
[22] Filed: Dec. 30, 1970
[21] Appl. No.: 103,010

[30] Foreign Application Priority Data
Jan. 9, 1970   Switzerland............................ 241/70

[52] U.S. Cl.... 260/397.47, 260/349, 260/239.55 R, 260/239.55 C
[51] Int. Cl........................................... C07c 169/30
[58] Field of Search................................ 260/397.47

[56] References Cited
UNITED STATES PATENTS
3,505,317  4/1970  Taub............................ 260/239.55
3,207,768  9/1965  Nathansohn................... 260/397.47

OTHER PUBLICATIONS
Bull. Soc. Chim. (1962) No. 1 Page 90.

Primary Examiner—Elbert L. Roberts
Attorney—Harry Goldsmith, Joseph G. Kolodny and Mario A. Monaco

[57]  ABSTRACT
Process for the manufacture of 21-fluoro-20-oxopregnane compounds of the partial formula

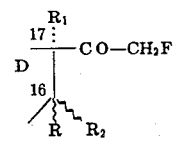

wherein R denotes hydrogen and $R_1$ and $R_2$ each denote hydrogen or a hydrocarbon radical or $R_1$ together with R denotes a double bond, wherein a steroid of the following partial formula

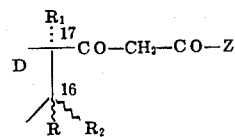

wherein R, $R_1$ and $R_2$ have the same meaning as above and Z represents hydrogen or an esterified carboxyl group, is reacted with an agent which transfers diazo groups, the resulting 21-diazo 20-ketone of partial formula

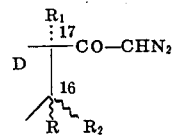

is reacted with hydrogen fluoride and, if desired, functionally modified hydroxyl groups are converted into free hydroxyl groups or free hydroxyl groups are functionally modified at any desired stage.

27 Claims, No Drawings

PROCESS FOR THE MANUFACTURE OF 21-FLUOROSTEROIDS

The subject of the present invention is a new process for the manufacture of 21-fluorosteroids of the pregnane series, especially of 21-fluor-20-oxo-pregnane compounds of partial formula

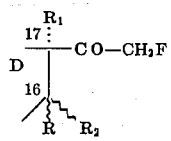

wherein R denotes hydrogen and $R_1$ and $R_2$ each denote hydrogen or a hydrocarbon radical or $R_1$ together with R denotes a double bond, starting from corresponding 21-unsubstituted 20-oxo-pregnane compounds.

21-Fluorinated steroids of the pregnane series, especially 21-fluor-20-oxo-pregnanes and their unsaturated derivatives, are known in large numbers. They are of great importance because of their pharmacological properties. Amongst the processes which have hitherto become known and are usually employed for their manufacture, the reaction of a 21-iodo-pregnane compound with silver fluoride should above all be mentioned, in which the iodides in turn can be manufactured from appropriate reactive esters of the 21-hydroxy-pregnanes, for example the 21-tosylates, with sodium iodide, or by iodination of a 21-alkoxalyl derivative of a 20-oxo-pregnane compound or again by iodination of a $\Delta^{20}$-20-enol-ester of the appropriate 20-oxo-pregnane compound by means of iodosuccinimide or finally by iodination of the 21-unsubstituted 20-oxo-pregnane compounds with iodine and calcium oxide. As a result of the relative instability of the iodine-containing intermediate products mentioned, these processes can be unsatisfactory, especially when performed on an industrial scale.

According to the process of the present invention, 21-fluoro-steroids of the pregnane series of the type characterised above can now be manufactured conveniently and in good yield from the appropriate 21-unsubstituted pregnane compounds.

The process of the present invention is characterised in that a steroid of the following partial formula

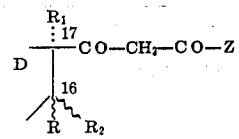

wherein R denotes hydrogen and $R_1$ and $R_2$ each denotes hydrogen or a hydrocarbon radical or $R_1$ together with R denotes a double bond and Z denotes hydrogen or an esterified carboxyl group, is reacted with an agent which transfers diazo groups, the resulting 21-diazo-20-ketone of partial formula

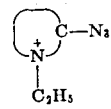

is reacted with hydrogen fluoride and, if desired, functionally modified hydroxyl groups are converted into free hydroxyl groups, or free hydroxyl groups are functionally modified, at any desired stage.

Sulphonylazides, preferably arylsulphonylazides, such as for example p-tosylazide or p-carboxyphenyl-sulphonylazide, are primarily used for the reaction, according to the process, of the starting steroid mentioned with an agent which transfers diazo groups.

Furthermore, azidinium salts can also be used as agents which transfer diazo groups. As such, the tetrafluoborates of cations of the type $$\underset{\underset{C_2H_5}{|}}{\overset{}{\left[\begin{array}{c}\phantom{x}\\N\end{array}\right]}}C-N_3$$

wherein the ring denotes benzothiazole, benzimidazole, pyridine or quinoline, especially 3-ethyl-2-azidobenzothiazolium fluoborate, should for example be mentioned. Finally, nitrodiazoacetic acid esters, for example nitrodiazoacetic acid ethyl ester, can also be used as agents which transfer diazo groups.

When using sulphonylazides the reaction is preferably carried out in the presence of a base. Possible bases are primarily strong organic bases, such as triethylamine. Amongst the inorganic bases preferably to be used, sodium hydride may for example be mentioned. The reaction is carried out in a suitable organic solvent, such as a hydrocarbon, such as benzene or toluene, or a chlorinated aliphatic hydrocarbon, for example chloroform, methylene chloride or ethylene chloride, an ether, such as tetrahydrofuran, or an amide or nitrile, for example acetonitrile, at low temperature or at room temperature.

The reaction, according to the process, with azidinium salts takes place on the other hand in the acid or neutral range, for example in aqueous-alcoholic solution or suspension at 0–80°.

If nitrodiazoacetic acid esters are used as agents which transmit diazo groups, a base is used in the reaction, as in the case of the sulphonylazides.

The reaction, according to the process, of the diazoketone of the above partial formula (2) with hydrogen fluoride is carried out in a suitable solvent which is inert towards the diazo group, for example a tertiary alcohol, such as tert. amyl alcohol or an ether, such as diethyl ether, or a cyclic ether such as tetrahydrofuran or dioxan but especially diisopropyl ether. The steroid-21-azide can, for its part, preferably be dissolved in an inert solvent such as chloroform, methylene chloride or ethylene chloride.

The starting substances can be manufactured in a manner which is in itself known. For example, the appropriate 20-oxo-pregnane compounds are used as the starting compounds and are reacted with oxalic acid or formic acid esters, for example in the presence of a base, for example of an alkali metal alcoholate.

In the starting substances it is possible, apart from the substituents mentioned, for further optional substituents to be present in the remaining positions of the steroid skeleton, such as hydrocarbon radicals, halogen atoms, and free or functionally modified hydroxyl groups, such as especially esterified and etherified hydroxyl groups. The esterified hydroxyl groups are in particular derived from organic carboxylic acids of the aliphatic, alicyclic, aromatic or heterocyclic series with 1-15 carbon atoms and are thus for example the acyl radicals of formic acid, acetic acid, propionic acid, the butyric acids, valeric acids, such as n-valeric acid, or trimethylacetic acid, the caproic acids, such as β-trimethylpropionic acid or diethylacetic acid, the oenanthic, caprylic, pelargonic, capric and undecylic acids, for example undecylenic acid, lauric, myristic, palmitic or stearic acids, for example oleic acid, cyclopropanecarboxylic, cyclobutanecarboxylic, cyclopentanecarboxylic and cyclohexanecarboxylic acid, cyclopropylmethanecarboxylic acid, cyclobutylmethanecarboxylic acid, cyclopentylethanecarboxylic acid, cyclohexylethanecarboxylic acid, the cyclohexyl- or phenyl-acetic acids or -propionic acids, benzoic acid, phenoxyalkaneacids, such as phenoxyacetic acid, p-chlorophenoxyacetic acid, 2,4-dichlorophenoxyacetic acid, 4-tert.-butylphenoxyacetic acid, 3-phenoxypropionic acid, 4-phenoxybutyric acid, furane-2-carboxylic acid, 5-tert.-butyl-furane-2-carboxylic acid, 5-bromo-furane-2-carboxylic acid, nicotinic acid or isonicotinic acid. Further possibilities are also lower aliphatic and monocyclic aromatic sulphonic acids, such as methanesulphonic, ethanesulphonic, benzenesulphonic or p-toluenesulphonic acid, and also inorganic acids, such as sulphuric acid, hydrohalic acid and especially also phosphoric acids, for example orthophosphoric or metaphosphoric acid.

Etherified hydroxyl groups are for example those which are derived from lower aliphatic alcohols, such as methyl alcohol, ethyl alcohol, propyl alcohol, isopropyl alcohol, the butyl or amyl alcohols, from araliphatic alcohols, especially from monocyclic, aryl-lower aliphatic alcohols, such as benzyl alcohol, or from heterocyclic alcohols, especially from tetrahydropyranol or tetrahydrofuranol.

Hydrocarbon residues are especially alkyl groups, primarily lower alkyl groups, such as the methyl or ethyl group. Additionally to a double bond possibly present in the 16,17-position, further double bonds can also be present, for example in positions 4,5; 5,6,9,11 or 11,12.

In carrying out the process according to the invention, esterified hydroxyl groups can be liberated under alkaline conditions.

On the other hand, etherified hydroxyl groups, such as a tetrahydropyranyloxy group, can be split during the treatment of the 21-diazoketone with hydrogen fluoride, according to the process. Thus, under certain circumstances, the esterified or etherified hydroxyl groups present in the starting substances are present in the process products as free hydroxyl groups. On the other hand, functionally modified hydroxyl groups, such as esterified or etherified hydroxyl groups, can, if desired, be liberated at any stage in a manner which is in itself known, or free hydroxyl groups can, if desired, be esterified or etherified.

Amongst the process products, those of the following formula

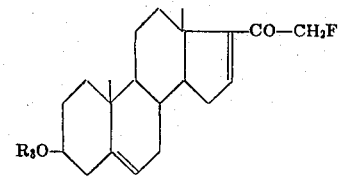

should especially be mentioned, wherein $R_3$ denotes hydrogen or an organic acyl radical, preferably having 1-15 carbon atoms, especially a lower aliphatic acyl radical, such as acetyl, propionyl, butyryl or trimethylacetyl. These new compounds are not only of great interest as very interesting starting products for the manufacture of the most diverse pharmacologically active fluorinated steroids, but also themselves possess a pharmacological activity. Thus they possess an anti-virus action, and are in particular active against Herpes simplex in tissue cultures.

As intermediate products, the abovementioned new 21-fluorosteroids are especially suitable for the manufacture of 21-fluoro-pregnane compounds having a $\Delta^4$-3-oxo group and, if desired, a 16,17-dihydroxy grouping or a 17-hydroxy or acyloxy group. Such compounds are already known and are of great importance as gestagenic agents and ovulation inhibitors.

The invention also relates to those embodiments of the process in which one starts from a compound obtainable as an intermediate product at any stage and carries out the missing stages, or in which a starting substance is formed under the reaction conditions.

The present invention also relates to the manufacture of pharmaceutical preparations for use in human or veterinary medicine, which contain the new pharmacologically active substances, described above, of the present application as active substances together with a pharmaceutical excipient. Organic or inorganic substances which are suitable for enteral administration, for example oral, parenteral or topical adminstration are used as excipients. Suitable substances for forming the excipients are those which do not react with the new compounds, such as for example water, gelatine, lactose, starch, magnesium stearate, talc, vegetable oils, benzyl alcohols, gum, polyalkylene glycol, white petroleum jelly, cholesterol and other known medicinal excipients. The pharmaceutical preparations can be in the solid form, for example as tablets, dragees or capsules, or in a liquid or semi-liquid form as solutions, suspensions, emulsions, ointments or creams. These pharmaceutical preparations are optionally sterilised and/or contain auxiliary substances such as preservatives, stabilisers, wetting agents or emulsifiers, salts for regulating the osmotic pressure or buffers. They can also contain yet other therapeutically valuable substances. The new compounds can also serve as starting products for the manufacture of other valuable compounds.

The compounds of the present application can also be used as fodder additives.

The invention is described in more detail in the examples which follow.

Example 1

A solution of 250 g of oxalic acid dimethyl ester in 500 ml of benzene is added to 60 g of sodium methylate in 3 l of benzene whilst stirring in an atmosphere of nitrogen, and is rinsed down with 500 ml of benzene. After 20 minutes stirring at 10–15°C, a solution of 200 g of 3β-acetoxy-20-oxo-Δ$^{5,16}$-pregnadiene in 4 l of benzene is added, being rinsed down with 1 l of benzene. The mixture is then stirred for 4½ hours at 0–5°C and subsequently for 32 hours at room temperature. Thereafter 232 ml of triethylamine and 330 g of p-toluenesulphonylazide are added, being rinsed down with 1 l of benzene. After 35 hours, the mixture is poured into 25 l of water and is extracted once with 25 l of chloroform and twice with 15 l of chloroform at a time. The organic phases are washed with 15 l of water, dried and evaporated to dryness in vacuo at a bath temperature of 40°C.

The crystalline residue is stirred for 2½ hours with 10 l of tert.-butylalcohol and 2 l of 2 N potassium hydroxide solution in a nitrogen atmosphere so as to saponify the 3-acetoxy group completely. The mixture is then poured into 25 l of water and 10 l of saturated sodium chloride solution and is repeatedly extracted with chloroform. The organic phases are washed with dilute sodium chloride solution, dried, and evaporated to dryness in vacuo at a bath temperature of 40°C, after which the residue is stirred with about 1.5 l of ether. After cooling, filtering off and washing with cold ether, 3β-hydroxy-20-oxo-21-diazo-Δ$^{5,16}$-pregnadiene is obtained in the form of light yellow crystals which decompose at 178°C.

By chromatography of the mother liquor residue on 1.5 kg of aluminium oxide (activity II), a further quantity of the same compound can be obtained from the fractions eluted with toluene-ethyl acetate (4:1) mixture.

Example 2

A solution of 57 g of hydrogen fluoride in 250 ml of isopropyl ether is added, whilst stirring and cooling with an ice-sodium chloride mixture, to a suspension of 30 g of the 3β-hydroxy-20-oxo-21-diazo-Δ$^{5,16}$-pregnadiene, obtained according to Example 1, in 1.5 l of absolute chloroform. 6 minutes later the mixture is poured out into a solution of 500 g of sodium acetate in 1.5 l of water, whilst stirring, and 850 ml of 2 N sodium carbonate solution are then added. After repeated extraction with chloroform, the organic solutions are washed with sodium hydrogen carbonate solution, dried and evaporated to dryness in vacuo. The residue is chromatographed on 900 g of aluminium oxide (activity II), with the 3β-hydroxy-20-oxo-21-fluoro-Δ$^{5,16}$-pregnadiene being eluted with toluene-ethyl acetate (9:1) mixture. After crystallisation from a methylene chloride-ether-petroleum ether mixture, the product melts at 198.5–203.5°C.

Example 3

66 ml of 4 N sodium hydroxide solution and 132 ml of 30 per cent strength hydrogen peroxide are simultaneously allowed to run into a suspension of 33 g of the 3β-hydroxy-20-oxo-21-fluoro-Δ$^{5,16}$-pregnadiene obtained according to Example 2 in 2.2 l of methanol, whilst stirring and cooling, at such a speed that the internal temperature always remains below 0°C. After 24 hours stirring at 0°C the mixture is poured into 9 l of water, after which the product is filtered off, rinsed with water and dried in vacuo. 3β-Hydroxy-16α,17α-epoxy-20-oxo-21-fluoro-Δ$^5$-pregnene of melting point 186–198°C is thus obtained and is used in this purity for the next stage. A preparation repeatedly recrystallised from methylene chloride-ether-petroleum ether mixture melts at 198.5–201°C.

300 ml are distilled off from a solution of 55.2 g of the crude 3β-hydroxy-16α,17α-epoxy-20-oxo-21-fluoro-Δ$^5$-pregnene obtained above in 3 l of toluene and 600 ml of cyclohexanone whilst stirring in an atmosphere of nitrogen, after which a solution of 84 g of aluminium isopropylate in 600 ml of toluene is allowed to run in over the course of 5 minutes. After boiling for one hour under reflux and adding 300 ml of glacial acetic acid, the mixture is poured into 4 l of saturated sodium potassium tartrate solution and the mixture is repeatedly extracted with toluene. Undissolved constituents are removed by filtration using Celite. The organic solutions are washed with saturated sodium potassium tartrate solution, dried and evaporated to dryness in vacuo, after which the high boiling constituents are finally removed at 80°C in a high vacuum.

The residue, dissolved in methylene chloride, is thereafter filtered through 900 g of aluminium oxide, rinsing with toluene and toluene-ethyl acetate (9:1) mixture. 3,20-Dioxo-16α,17α-epoxy-21-fluoro-Δ$^4$-pregnene of melting point 245–249° is thus obtained by crystallisation of the residue obtained from the filtrate by evaporation in vacuo from a methylene chloride-ether-petroleum ether mixture. Renewed recrystallisation raises the melting point to 249.5–252°C.

2.32 g of the 3,20-dioxo-16α,17α-epoxy-21-fluoro-Δ$^4$-pregnene obtained above and 23 ml of glacial acetic acid are mixed with 23 ml of a 10 percent strength solution of hydrogen bromide in glacial acetic acid whilst stirring. After a short time everything has dissolved, whereupon crystallisation again takes place. Working up takes place after 30 minutes. The mixture is poured into a solution of 23 g of sodium acetate in 230 ml of water and is repeatedly extracted with methylene chloride. The organic solutions are washed with sodium hydrogen carbonate solution, dried and evaporated to dryness in vacuo. Crystallisation from methylene chloride-ether yields the 3,20-dioxo-16β-bromo-17α-hydroxy-21-fluoro-Δ$^4$-pregnene which melts at 202–204°C with decomposition.

A mixture of 15.1 g of the 3,20-dioxo-16β-bromo-17α-hydroxy-21-fluoro-Δ$^4$-pregnene described, 750 ml of benzene, 8.2 ml of ethylene glycol and 326 mg of p-toluenesulphonic acid is allowed to boil for 4 hours under reflux, whilst stirring in an atmosphere of nitrogen and using a water separator. Thereafter the cooled solution is poured into 750 ml of a 1 percent strength sodium acetate solution in water, whilst stirring. After repeated extraction with toluene, the organic solutions are washed with water, dried and evaporated to dryness in vacuo. The crystalline residue is briefly boiled with ether and is then cooled, filtered off and rinsed with cold ether. 3-Ethylenedioxy-16β-bromo-17α-hydroxy-20-oxo-21-fluoro-Δ$^5$-pregnene is thus obtained, melting with decomposition at 190–195°C.

12.63 g of the 3-ethylenedioxy-16β-bromo-17α-hydroxy-20-oxo-21-fluoro-Δ$^5$-pregnene described above, 2.2 g of magnesium oxide, 800 mg of 5 percent strength palladium on charcoal and 400 ml of methanol are shaken in a hydrogen atmosphere until no further hydrogen is taken up. The catalyst and magnesium oxide are then filtered off, rinsed with methylene chloride, and the mixture poured into water. After repeated extraction by shaking with methylene chloride, the extracts are washed with water, dried and evaporated to dryness in vacuo. Recrystallisation of the residue from methylene chloride-ether yields 3-ethylenedioxy-17β-hydroxy-20-oxo-21-fluoro-Δ⁵-pregnene.

1 g of the ketal thus obtained together with 10 ml of 90 percent strength acetic acid in an atmosphere of nitrogen is dipped for 10 minutes, into a bath of 100°C. The material is then cooled and poured into water. After extraction with methylene chloride, washing with sodium hydrogen carbonate solution, drying and evaporated to dryness in vacuo, the residue is recrystallised from methanol, whereupon the known 3,20-dioxo-17α-hydroxy-21-fluoro-Δ⁴-pregnene of melting point 229.5–234°C is obtained.

Example 4

A mixture of 600 mg of sodium methylate, 2.5 g of oxalic acid dimethyl ester and 40 ml of benzene is stirred for 5 minutes at 5°C in a stream of nitrogen. A solution of 2 g of 3β-acetoxy-20-oxo-Δ⁵-pregnene in 40 ml of benzene is then added, being rinsed down with 10 ml of benzene. After stirring for 3 hours at 6°C and 21 hours at room temperature, 2.32 ml of triethylamine and 3.3 g of p-toluenesulphonylazide are added and rinsed down with 10 ml of benzene. 48 hours later the mixture is poured into water, extracted with methylene chloride, and the extract washed with water, dried and evaporated to dryness in vacuo. The residue is dissolved in 80 ml of methanol, mixed with 40 ml of N potassium hydroxide solution in methanol, and left to stand for 1½ hours in a nitrogen atmosphere at room temperature.

The mixture is then poured into water and extracted with methylene chloride, and the extract is washed with dilute sodium chloride solution, dried and evaporated to dryness in vacuo at a bath temperature of 30°C.

Chromatography of the residue on 60 g of aluminium oxide (activity II) yields 3β-hydroxy-20-oxo-21-diazo-Δ⁵-pregnene of melting point 149–151°C (decomposition) from the fractions eluted with toluene-ethyl acetate (4:1) mixture.

6.5 g of the diazo compound obtained above are dissolved in 40 ml of methylene chloride and 80 ml of ether, after which 140 ml of a 40 percent strength solution of hydrogen fluoride in ether is added whilst stirring and cooling with an ice-sodium chloride mixture. After 40 minutes stirring at −13°C the mixture is poured into 6 l of saturated sodium hydrogen carbonate solution and repeatedly extracted with methylene chloride. The residue obtained by evaporation in vacuo of the organic solution which have been washed with water and dried is chromatographed on 195 g of aluminium oxide (activity II). 3β-Hydroxy-20-oxo-21-fluoro-Δ⁵-pregnene of melting point 174–178.5°C is obtained from the fractions eluted with toluene-ethyl acetate (9:1) mixture by crystallisation from methylene chloride-ether.

We claim:
1. Process for the manufacture of 21-fluoro-20-oxopregnane compounds of the partial formula

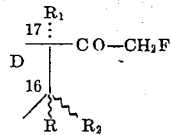

wherein R denotes hydrogen and $R_1$ and $R_2$ each denote hydrogen or a hydrocarbon radical or $R_1$ together with R denotes a double bond, wherein a steroid of the following partial formula

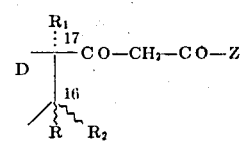

wherein R, $R_1$ and $R_2$ have the same meaning as above and Z represents hydrogen or an esterified carboxyl group, is reacted with a sulfonyl-azide the resulting 21-diazo 20-ketone of partial formula

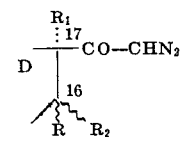

is reacted with hydrogen fluoride.

2. Process as claimed in claim 1, wherein arylsulfonylazides are used.

3. Process as claimed in any one of claims 1 and 2, wherein the reaction with the sulfonylazide is carried out in the presence of a base.

4. Process as claimed in claim 3, wherein a strong organic base is used.

5. Process as claimed in claim 4, wherein triethylamine is used.

6. Process as claimed in claim 3, wherein inorganic bases are used.

7. Process as claimed in claim 6, wherein sodium hydride is used.

8. Process as claimed in claim 1, wherein the reaction is carried out in a hydrocarbon, a chlorinated aliphatic hydrocarbon in an ether, in an amide or nitrile.

9. Process as claimed in claim 8, wherein there is used toluene or benzene.

10. Process as claimed in claim 1, wherein the reaction is effected at low temperature or a room temperature.

11. Process as claimed in any one of claims 1–10, wherein p-tosylazide is used as the sulfonylazide.

12. Process as claimed in any one of claims 1–10, wherein p-carboxyphenylsulfonylazide is used as the sulfonylazide.

13. Process as claimed in claim 1, wherein azidinium salts are used as the agent capable of transferring diazo groups and the reaction is carried out in an acidic or neutral medium.

14. Process as claimed in claim 13, wherein tetrafluoborates of cations of the type

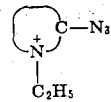

wherein the ring denotes benzothiazole, benzomidazole, pyridine or quinoline is used as the azidium salt.

15. Process as claimed in claim 13, wherein the reaction is carried out in an aqueous-alcoholic solution or suspension.

16. Process as claimed in claim 1, wherein nitrodiazoacetic acid ester is used as the agent capable of transferring diazo groups and the reaction is carried out in the presence of a base.

17. Process as claimed in claim 1, wherein the reaction of the diazo-ketone obtained with hydrofluoric acid is effected in a solvent which is inert towards the diazo function.

18. Process as claimed in claim 17, wherein an ether is used.

19. Process as claimed in claim 1, wherein there are used starting compounds of the formula

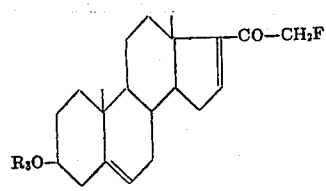

wherein R, $R_1$, $R_2$ and Z have the meaning given in claim 1 and $R_3$ represents a member selected from the group consisting of hydrogen and an organic acyl radical having from 1 to 15 carbon atoms.

20. Process as claimed in claim 19, wherein starting compounds of the formula given that claim are used, in which $R_3$ represents a lower aliphatic acyl radical.

21. A compound of the formula

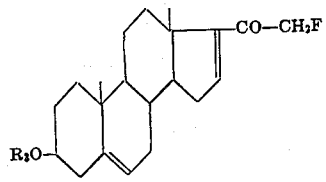

wherein $R_3$ represents a member selected from the group consisting of hydrogen and an organic acyl radical with 1 to 15 carbon atoms.

22. A compound as claimed in claim 21, wherein $R_3$ represents a lower organic acyl radical.

23. The compound of the formula

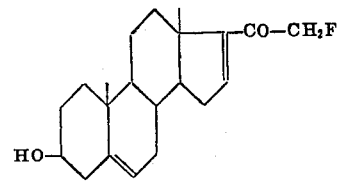

24. The 3-acetate of the compound of the formula 23.

25. A compound of the formula

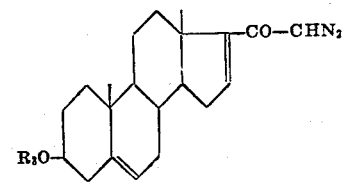

wherein $R_3$ represents a lower organic acyl radical.

26. The compound of the formula

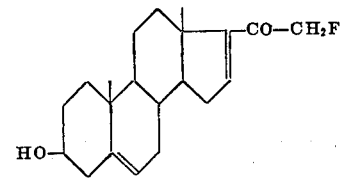

27. The 3-acetate of the compound of claim 26.

* * * * *

PO-1050
(5/69)

UNITED STATES PATENT OFFICE
CERTIFICATE OF CORRECTION

Patent No. 3,758,524           Dated    September 11, 1973

Inventor(s)  GEORG ANNER ET AL

It is certified that error appears in the above-identified patent and that said Letters Patent are hereby corrected as shown below:

Column 10, claim 26, upper right-hand portion of formula should read

-- $-CO-CHN_2$ --

Signed and sealed this 4th day of June 1974.

(SEAL)
Attest:

EDWARD M. FLETCHER, JR.
Attesting Officer

C. MARSHALL DANN
Commissioner of Patents